Oct. 25, 1932.  R. L. JENKINS ET AL  1,884,710
CATALYTIC PROCESS FOR HYDROLYZING ORGANIC HALIDES
Filed Nov. 17, 1928
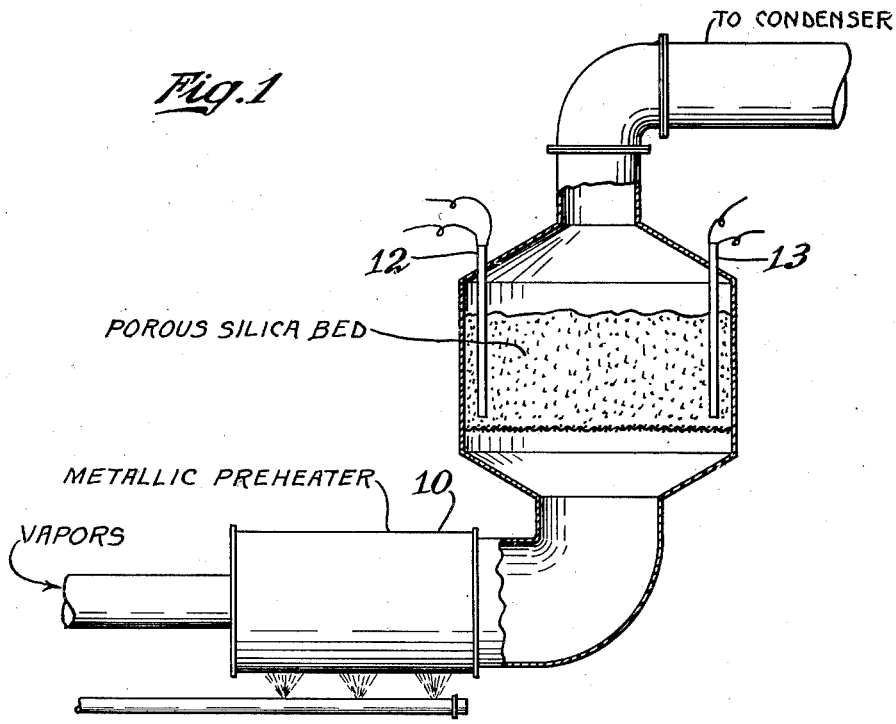
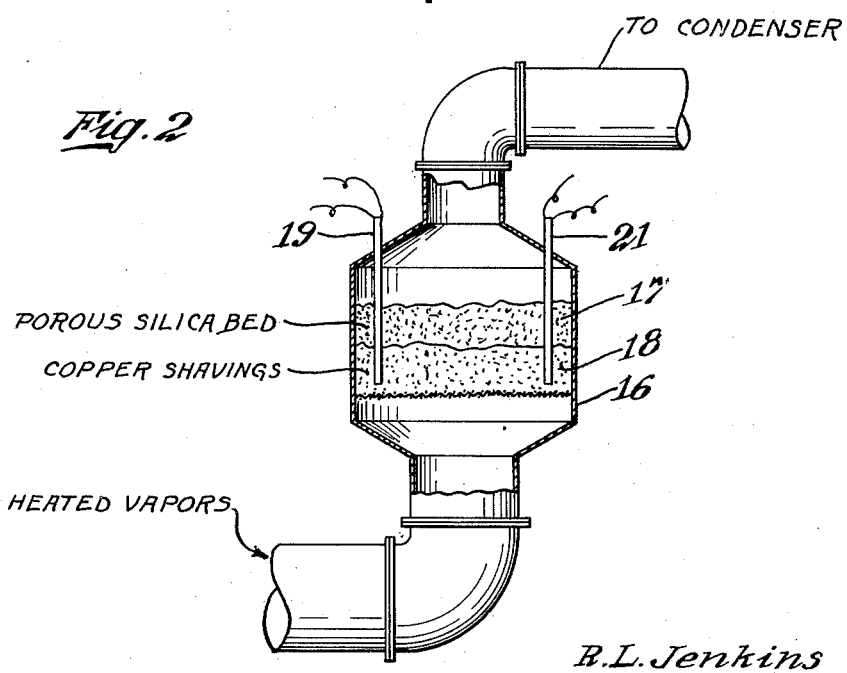
Inventors
R.L. Jenkins
J.F. Norris
By Johnston & Jennings
Attorneys Patented Oct. 25, 1932

1,884,710

UNITED STATES PATENT OFFICE

RUSSELL L. JENKINS, OF ANNISTON, ALABAMA, AND JAMES F. NORRIS, OF CAMBRIDGE, MASSACHUSETTS, ASSIGNORS TO SWANN RESEARCH, INC., A CORPORATION OF ALABAMA

CATALYTIC PROCESS FOR HYDROLYZING ORGANIC HALIDES

Application filed November 17, 1928. Serial No. 320,000.

Our invention relates to a catalytic process, and more particularly to means whereby the activity of the catalytic agent may be maintained. Specifically, it relates to improved means whereby a catalytic agent, for example, silica gel or silica skeleton, hereinafter referred to as a highly porous body, may be used for the hydrolysis reaction of an organic halide with steam to form organic hydroxy compounds, such as phenols or alcohols.

An object of this invention is the provision of a process for hydrolyzing organic halides on a catalytic body by means of steam, wherein the efficiency of said catalytic body is built up and maintained at a high degree while in continuous use.

A further object of our invention is to provide an improved process for the production of phenol by catalytic hydrolysis employing a porous silica catalyst, wherein the efficiency of the catalyst is enhanced by impregnation with a metallic compound, and wherein said metallic compound is continually supplied in volatilized form with the reaction mixture.

The catalyst is characterized by comprising a highly porous body as its major ingredient, and a metallic salt or combination of metallic salts as its minor ingredient. The metallic salt may be obtained from a metal, alloys of a metal, or compounds thereof, which form volatile salts under conditions which exist in the use of our catalyst. Our catalyst and the method of association of the metallic salt, is adapted to use in a variety of reactions; and for purposes of illustration in this application, we will refer to its use in the hydrolysis of monochlorbenzene and water in the vapor phase, to form phenol.

It has already been proposed to hydrolyze the halides of hydrocarbons by passing a reaction mixture in a vapor phase over a heated catalyst bed comprised of porous silica. This process has been found to be especially useful in the production of phenol from monochlorbenzene, the monochlorbenzene, together with steam, and heated to around 550° C., being passed through the porous silica catalyst bed. In carrying out this process, we have found that the activity of the catalyst bed is greatly increased by having associated therewith a metallic catalyzing agent. The increase in activity brought about by the association of the metallic catalyzing agent with the porous silica catalyst is, in some instances, ten times that of the porous silica catalyst alone.

With reference to the use of the catalyst in the above mentioned reaction, in our research we have found when impregnating a highly porous body with a metallic salt by use of an aqueous solution and subsequently evaporating the water, the catalyst so obtained gradually loses its activity with continued use, and finally must be removed from the reaction chamber to be impregnated again. It is obvious that as the metallic salt is lessened in association with the porous body, the catalyst will become less efficient, and therefore a problem is presented of maintaining the catalyst at maximum efficiency. By means of our present invention, the removal of the highly porous body from the reaction chamber is unnecessary, and the catalyst is always at its maximum efficiency. While other metals, as iron, bismuth, tin and cobalt, will form volatile salts and, when associated with a highly porous body, increase the catalytic activity thereof, we will refer to to the use of copper, alloys of copper or compounds thereof, these being the preferred sources of metallic salt.

We have found that if a body of copper shavings be interposed in a vapor stream before it passes through a porous body, such as, before mentioned, the vapors of monochlorbenzene and steam pass over the copper shavings, there is sufficient action on the shavings to form a very small quantity of cuprous chloride, which is vaporized and passes along with the reaction mixture over the porous body. The association of the metallic salt vapors and the highly porous body result in a catalytic action on the reaction mixture whereby phenol and hydrochloric acid are formed, said catalytic action being far greater than is obtained with the use of the porous body alone. Instead of placing copper shavings in the gas stream, the vapors may be preheated in a preheater made of copper or alloys thereof, such as yellow brass, and in either case sufficient copper will be supplied to the gas stream to maintain optimum catalytic activity. It is also satisfactory to pass the reaction mixture over copper oxide.

In order that our invention may be clearly understood, reference will now be had to the accompanying diagrammatic drawing wherein Figs. 1 and 2 show respectively alternate methods of carrying out the invention.

Referring first to Fig. 1, the reaction mixture in the form of vapor passes through a metallic preheater 10 which is preferably made of copper or alloys thereof, and wherein the vapors are heated to around 550° C. The heating of the vapors in this preheater supplies sufficient metallic salt in a vapor form to the reaction mixture to maintain optimum catalytic activity. After passing the preheater 10 the vapors flow through a porous silica catalyst bed which is also heated by means of suitable electric heating elements 12 and 13 to around 550° C. After passing through the porous silica bed, the vapors may be condensed and the phenol formed separated in a manner well known in the art.

Referring now to Fig. 2, we may provide a casing 16 inclosing a porous silica catalyst bed 17 and a bed of copper shavings 18. The silica bed and the bed of copper shavings are both heated to around 550° C. by means of suitable electric heating elements 19 and 21. With this apparatus, the vapors pass through the heated bed of copper shavings and thence immediately through the porous silica bed, carrying with them a sufficient amount of volatilized metallic salt to greatly increase the catalytic activity of the porous silica bed.

From the foregoing it will be apparent that we have devised an improved catalyst together with a means for greatly increasing its catalytic activity and maintaining its high order of catalytic activity.

While we have described two ways of carrying out our invention, it will be obvious to those skilled in the art that it is not so limited but is susceptible of various changes and modifications without departing from the spirit thereof, and we desire therefore that only such limitaions shall be placed thereupon as are imposed by the prior art, or as are specifically set forth in the appended claims.

What we claim is:

1. An improved method of producing a catalytic reaction which consists in passing a reaction mixture in the vapor phase over a metal having catalytic properties and being capable of forming a volatile salt under the conditions of use, and then passing said volatile metal salt commingled with the reaction mixture through a bed comprising a highly porous body.

2. An improved method of producing a catalytic reaction which consists in passing a reaction mixture in the vapor phase over a metallic salt having catalytic properties and being capable of forming a volatile salt under the conditions of use, and then passing said volatile metal salt together with the reaction mixture through a bed consisting of a highly porous body.

3. The method of maintaining the rate of a catalytic reaction wherein a porous body is employed as a catalyst which comprises subjecting said body to a vapor stream of the reaction mixture associated with a volatilized metallic compound having catalytic properties.

4. The method of producing a catalytic reaction which consists in passing in the vapor phase the products to be combined together with a volatilized metallic salt having catalytic properties through a porous silica catalyst bed.

5. The method of producng phenol which consists in passing monochlorbenzene in the vapor phase together with steam and a volatilized metallic salt, through a porous silica catalyst bed.

6. An improved method of effecting the hydrolysis of an organic halide which consists in passing a reaction mixture of said halide and water both in the vapor phase over a metallic compound having catalytic properties when combined with a highly porous body to form a metallic salt in association with said mixture, then passing said reaction mixture together with the metallic salt through a bed comprising said highly porous body.

7. An improved method of producing phenol which consists in passing vapor containing monochlorbenzol, steam and a volatilized coper salt over a porous silica skeleton, followed by condensing and separating the phenol from the reaction mixture.

8. An improved method of producing phenol which consists in passing vapor containing monochlorbenzol and steam over copper oxide and at a temperature high enough to produce a volatilized copper salt, and then passing said vapor over a porous silica skeleton.

9. In a process of producing phenol by catalytic hydrolysis of monoclorbenzene, the steps which comprise passing in the vapor phase the reaction mixture at a temperature above 500° C. over coper oxide, and then over a highly porous silica catalyst bed.

10. The method of producing a catalytic reaction which consists in passing a reaction mixture in the vapor phase over a substance having catalytic properties and being capable of forming a volatile metal salt under the conditions of use, and then passing said volatile metal salt commingled with the reaction mixture through a bed comprising a highly porous body.

In testimony whereof we affix our signatures.

RUSSELL L. JENKINS.
JAMES F. NORRIS.